Patented June 23, 1942

2,287,440

UNITED STATES PATENT OFFICE 2,287,440

PROCESS OF MAKING PIGMENT MATERIAL

Ray L. McCleary, Richardson Park, Del., assignor to E. I. du Pont de Nemours & Company, Wilmington, Del., a corporation of Delaware No Drawing. Application March 16, 1939,
Serial No. 262,184

6 Claims. (Cl. 83—94)

This invention relates to the art of white pigment materials. More particularly it relates to the art of white pigment extenders. Still more particularly it relates to an improved process for producing calcium carbonate extender material.

It is well known in the pigment art that prime white pigments such as titanium dioxide, zinc sulfide, zinc oxide, and the like, having indices of refraction of more than about 2, are usually mixed with white extender materials such as barium sulfate, calcium sulfate, magnesium silicate, calcium carbonate, and the like, having indices of refraction of less than about 1.7, when employed in white coating compositions such as enamel paints, flat paints, and the like. Such extender materials not only are employed as diluents to lower the cost of said coating compositions but when employed as diluents in this manner they markedly increase the efficiency and hiding power of the high strength pigments and, moreover, impart highly desirable properties to the films of said coating compositions.

On account of its low price, high bulking value, and other desirable characteristics, calcium carbonate has long been recognized as a white extender material well adapted for employment with the aforementioned high strength pigment materials in many of said coating composition formulations. However, the use of the two types of calcium carbonate heretofore available for such use, namely, precipitated calcium carbonate, and milled, naturally occurring calcium carbonate, has been limited in certain instances, particularly in enamel paint formations where it is essential that the pigment materials employed should be of excellent fineness and color and should provide films having high gloss. Precipitated calcium carbonate, such as that obtained by reacting lime or calcium hydroxide with carbon dioxide, or by reacting a solution of sodium carbonate with lime or calcium hydroxide, when prepared under such conditions as to insure the provision of a calcium carbonate of sufficient fineness for employment as a pigment extender, has far too high an oil absorption to permit its employment in enamel type paint formulations. On the other hand, milled, naturally occurring calcium carbonate, such as ground limestone, in most instances is not sufficiently fine and has far too poor a color to permit its employment in said enamel type paint formulations. Furthermore, the enamel paint films which are obtained when said milled, naturally occurring calcium carbonate is employed, not only lack the clean white color desired in said films but also present a dull, matte appearance which is undesirable in enamel films.

This invention has an object the provision of a calcium carbonate which has greatly improved properties for use as a prime pigment extender in paint formulations, especially in the enamel type. A further object is the provision of a method for producing improved calcium carbonate from naturally occurring calcium carbonate, particularly from naturally occurring calcite. A still further object is the production from naturally occurring calcium carbonate deposits of a calcium carbonate extender material which may be employed in enamel type paint formulations to provide films of excellent gloss and color. A still further object is the production from naturally occurring calcium carbonate deposits of calcium carbonate having high strength, relatively low oil absorption, and excellent fineness. A still further object is the removal of iron disulfide ($FeS_2$) from calcium carbonate ores. Additional objects will become apparent from an examination of the following description and claims.

These and other objects and advantages are accomplished by the following invention which broadly comprises grinding, crushing, or powdering naturally occurring calcium carbonate, heating the resultant material to a temperature in the range of from about 425° C. to about 550° C., effecting magnetic separation of the calcium carbonate from its magnetic constituents, wet milling the resultant purified calcium carbonate and, thereafter, dewatering, drying, and dry milling said calcium carbonate.

In a more restricted sense, this invention comprises dry milling an iron disulfide comprising calcium carbonate to provide a coarse powder whose particles have diameters in the range of from about 0.15 to about 0.5 millimeter, heating said powder to a temperature in the range of from about 450° C. to about 550° C., effecting removal of the magnetic impurities in said powder by passing it through a magnetic separator, thereafter wet milling the calcium carbonate fraction to provide a finely divided powder substantially all of whose particles have diameters of not more than about 8 microns, and subsequently dewatering, drying, and dry milling said powder to break up the lumps formed on drying.

The preferred embodiment of this invention comprises crushing and disintegrating an iron disulfide comprising calcite ore to provide a coarse powder whose particles have diameters in the range of from about 0.25 to about 0.45 millimeter, heating said powder to a temperature in the range of from about 500° C. to about 550° C., maintaining said powder at this temperature for a period of not less than about 5 minutes and not more than about 15 minutes, effecting separation of the magnetic impurities thereby released by said heating operation by passing the powder through a magnetic separator, wet milling the resultant purified calcium carbonate to provide an aqueous suspension in which substantially all of the particles have diameters of less than about 6 microns, and, thereafter, dewatering, drying, and dry milling the finely divided calcium carbonate.

For a better understanding of the characteristics of the calcium carbonate of this invention, it will be necessary to explain the various terms used herein and the methods of testing employed.

*Oil absorption*

Oil absorption is the amount of oil, in grams, required to wet 100 grams of pigment.

The method of testing is described on pages 540–541 of the 8th (January 1937) edition of "Physical and Chemical Examination of Paints, Varnishes, Lacquers and Colors," by Henry A. Gardner.

A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

*Tinting strength*

Tinting strength is a measure of the effectiveness of a white pigment in covering up the tint of a colored pigment mixed with it, and is also a measure of the hiding power of a pigment in an enamel type paint formulation. The property is relative in nature and results are obtained in comparison with another pigment used as a standard. These results depend on the standard for magnitude but are independent of the standard for relative order.

Pastes are prepared by mulling together the white pigment, ultramarine blue, and acid refined linseed oil of 12.5 acid number for 3 minutes with a 15 pound weighted muller.

In all cases 3.0 grams of white pigment are mulled with 0.3 gram of ultramarine blue. The amount of oil used depends upon the oil absorption of the white pigment under test. Pigments having oil absorptions of more than 12 but less than 16 require the employment of 1.1 cc. oil in this test; pigments having oil absorptions in the range of from 16 to 22 require 1.2 cc. oil, while those having oil absorptions of more than 22 but less than 28 must be mulled with 1.3 cc. oil.

Standards are prepared in the same manner except for the amount of blue which is increased or decreased proportionately as it is desired to prepare standards for lower or higher strength. The standard pigment employed in testing the herein described blended pigments comprising 30% by weight pigment titanium dioxide and 70% calcium carbonate extender, was a standard titanium dioxide-calcium sulfate pigment having a tinting strength of 195 and comprising 30% by weight titanium dioxide and 70% anhydrite.

The sample paste is graded through a glass microscope slide between standards of higher and lower strength (i. e. less or more deeply tinted), and not more than 5% apart in strength.

The proportion of blue used in the standard paste to give any desired strength is inversely proportional to that strength. Thus, one standard is called arbitrarily 195 which corresponds to 0.3 gram of blue in the paste. The blue required to give 170 strength is $195/170 \times 0.3$.

The above method is similar to that described by J. E. Booge and H. E. Eastlack, in "Paint, Oil and Chemical Review," April 16, 1924.

*Color*

Color is the apparent brightness and tint of the pigment in an oil paste as measured relative to a standard similarly prepared, and is expressed in units on an arbitrary scale.

The pastes are prepared by mulling the pigment with acid refined linseed oil of acid number 12.5 to form a thick paste. The sample to be tested and the standard are placed beside each other on a colorless microscope slide 2" x 3" in daubs about 1½" x 1". The daubs should be in sharp contact without air bubbles in the contact line and should be sufficiently thick to cut off all transmitted light. The pastes are then graded under North sky light for differences in appearance. The minimum perceptible difference in brightness is called one point of color. The sample is graded in full points from the standard. Differences in tint are important. In the case of white pigments a yellowish cast of the sample is penalized in the grading to the extent of one or more points as it is barely perceptible or clearly evident. On the other hand, a bluish cast relative to the standard is desirable and consequently modifies the brightness grading upward. This procedure is essentially the one described by J. E. Booge and H. E. Eastlack, in "Paint, Oil and Chemical Review," April 9, 1924.

Pigments suitable for use in high quality white paints should have a color grading of 12 or higher on the arbitrary scale of the above color test.

*Gloss*

Gloss is the ability of a surface to reflect light regularly. It is determined on the Lange photoelectric gloss meter by the method described on pages 247–248 of Dr. St. John's translation of Dr. Lange's "Photoelements and Their Application" published in 1938 by Reinhold Publishing Corporation, the deflection of the needle of said gloss meter being adjusted to read 100 for a standard sample of polished black glass.

Having explained the terms used herein I can now proceed with a detailed description of my invention.

Various arrangements and selections of equipment for the operation of my novel process are possible. In the preferred arrangement, however, I crush in a jaw crusher a calcite ore comprising not less than about 98% calcium carbonate and having iron disulfide as its principal impurity, and disintegrate the crushed ore in a rotary hammer mill under such conditions as to provide a coarse powder whose particles have diameters of the order of about 0.4 millimeter. Said powder is heated to a temperature of about 540° C. and maintained at said temperature for a period of about 10 minutes, said heating being effected in an internally fired continuous rotating calciner in an oxidizing atmosphere comprising a large excess of air. The heated powder is cooled and subjected to a magnetic separation operation, as in a Wetherill magnetic separator, whereupon substantially all of the impurities present as iron disulfide in the original ore are separated from the calcium carbonate. The calcium carbonate is then wet milled as in a ball mill to provide a calcium carbonate of pigment fineness which is subsequently dewatered, dried, and disintegrated as in a rotary hammer mill to break up lumps formed on drying.

The following example is given for illustrative purposes and is not intended to place any restrictions or limitations on the herein described invention:

A sample of calcite rock comprising 98.4% calcium carbonate and 0.4% iron disulfide by weight was crushed in a jaw crusher and disintegrated in a rotary crusher to provide a coarse powder of which substantially all of the particles had diameters in the range of from 0.15 to 0.4 millimeter. 5 pounds of said powder was heated, exposed to atmospheric air, to 540° C. in an externally electrically heated rotating calciner, and maintained at that temperature for a period of 5 minutes, after which the heated powder was removed from said calciner and allowed to cool. The powder at room temperature was passed slowly through a laboratory size Ferrofilter, whereupon the iron impurity present as iron disulfide in the original calcite rock was removed and a relatively pure calcium carbonate powder was obtained. A 600 gram sample of the resultant calcium carbonate was wet milled for 20 hours in a 1 gallon pebble mill containing 3000 grams porcelain pebbles and 600 grams water and revolving at the rate of 60 revolutions per minute. The aqueous calcium carbonate suspension produced which comprised substantially no particles having diameters of more than 6 microns, was dewatered, dried at a temperature of 125° C., and disintegrated by passage through a squirrel cage disintegrator. The resultant calcium carbonate was designated as sample A. A second portion of the aforementioned calcite rock was treated in exactly the same manner as the hereinabove described novel product of my invention except that it was neither heated nor passed through the magnetic separator, i. e., it was merely crushed, disintegrated, wet milled, dewatered, dried, and disintegrated. The resultant calcium carbonate which was of poor color was designated as sample B. A third sample of the aforementioned calcite rock was treated in the same manner as the hereinabove described novel product of my invention except that it was only heated to a temperature of 300° C. The product thus obtained, which was designated as sample C, was identical in all respects with that designated as sample B. A fourth sample of the aforementioned calcite rock was treated in exactly the same manner as sample A, the novel calcium carbonate product of my invention, except that it was heated to a temperature of 650° C. This product thereby produced, designated as sample D, had a reddish brown tint and was unsuited for use even in the lowest grades of enamel type paint formulations. In the following table are listed the strength, oil absorption, and color of blended pigments comprising 30% by weight of pigment titanium dioxide and 70% by weight of the aforementioned samples A, B, C and D and of a representative dry milled limestone and a representative precipitated calcium carbonate such as are used as extenders in paint formulations. Also recorded are the gloss readings determined on films of a representative titanium dioxide-calcium carbonate enamel type paint formulation comprising the aforementioned samples of calcium carbonate.

| Sample | Oil absorption | Strength | Color | Enamel paint film gloss |
|---|---|---|---|---|
| A | 14 | 203 | 14 | 90 |
| B | 15 | 199 | 8 | 87 |
| C | 15 | 199 | 8 | 87 |
| D | 13 | 200 | 2 | 85 |
| Prior art precipitated CaCO3 | 24 | 202 | 13 | 69 |
| Prior art dry milled limestone | 11 | 170 | 10 | 75 |

It will be noted that the novel calcium carbonate extender of this invention, namely, sample A, had much lower oil absorption than did the precipitated calcium carbonate. Furthermore, it equaled said precipitated calcium carbonate in strength and color and was definitely superior in color to the other milled and otherwise treated naturally occurring calcium carbonates. Moreover, said sample A, when employed as an extender in a representative enamel type paint formulation, produced films having definitely better gloss than did all other types of calcium carbonates tested.

It is to be understood that the hereinbefore disclosed specific embodiments of my invention may be subject to variation and modification without departing from the scope of this invention. For instance, while my process is limited to calcium carbonate materials comprising iron disulfide, it may be employed to provide calcium carbonate extenders of good quality from calcium carbonate ores comprising widely varying proportions of this impurity. Optimum results are obtained when said iron disulfide is present in an amount not exceeding about 0.5% of the total ore weight, although my process is applicable to calcium carbonate ores comprising as much as about 20% or more iron disulfide. For most practical purposes it is preferred that the calcium carbonate ore treated should not contain more than about 2% of this impurity.

It is to be understood that the calcium carbonate ores treated by my process may contain impurities other than iron disulfide. However, when it is desired that the treated calcium carbonate should be a useful white pigment extender material, one should not practice this process on ores comprising more than about 3% of impurities other than iron disulfide.

While I prefer to employ in my process calcium carbonate ores in which substantially all the calcium carbonate is present as crystalline calcite, it is to be understood that calcium carbonate ores in which only part or even none of the calcium carbonate is present as crystalline calcite may also be employed. It should be noted, however, that regardless of the crystalline nature of the calcium carbonate ore employed, the product of my novel process differs from precipitated calcium carbonate and also from most naturally occurring calcium carbonates in that substantially all of the calcium carbonate is present in the form of well developed crystals of calcite.

It is to be understood that the grinding, crushing, or powering of the calcium carbonate ore is an essential feature of my invention. Said grinding may be effected in any of the crushing and/or disintegrating devices known to the art, but it is desirable that the grinding should be effected in such a manner that only a very minor proportion of the particles of the ground ore have diameters of less than about .1 millimeter or greater than about 0.6 millimeter, and preferably substantially all of the particles of said milled calcium carbonate should have diameters in the range of from about 0.25 to about 0.45 millimeter.

It is further to be understood that heating of the ground calcium carbonate ore at a temperature between about 425° C. and 550° C. is a very essential feature of my invention. Furthermore, it is desirable that said heating should be effected in an oxidizing atmosphere comprising not less than about 1% and preferably not less than about 10% oxygen by volume. If a temperature above about 550° C. is employed, serious deleterious effects on the resultant calcium carbonate extender color are produced. As stated herein, the preferred temperature range is between about 500° C. and about 550° C. Appreciable effects are obtained when the ground calcium carbonate ore is held at a temperature between about 425° C. and about 550° C. for as little as about 1 minute. Increased effects are obtained when the calcium carbonate is maintained at said temperature for a period of about 20 minutes. Holding the ground ore for periods of time in substantial excess of about 20 minutes at the higher temperatures of the aforementioned range, say at a temperature in the range of about 525° C. to about 550° C. results in serious degradation of the resultant calcium carbonate extender color. For most ordinary purposes, I prefer to maintain said powder at a temperature between about 425° C. and about 550° C. for a period of time between about 5 and about 15 minutes.

As hereinbefore stated, I prefer to effect separation of the magnetic impurities by passing the heated powder after it has been cooled to room temperature through a Wetherill magnetic separator, although it is to be understood that other forms of magnetic separators, such as the Ferraris magnetic separator, the Ball-Norton belt-type magnetic separator, the Leighton magnetic separator, the Humboldt separator, the Ferraris drum-type separator, the Interntional separator, the Ullrich magnetic separator, the Mechernich magnetic separator, the Dings magnetic separator, the Knowles New Century magnetic separator, the Cleveland-Knowles magnetic separator, and the like, may be employed without departing from the scope of this invention.

The optimum amount of wet milling to which the purified calcium carbonate product of this process is subjected can best be learned by experimental trial and will depend upon the use requirements of the finished calcium carbonate extender material. Thus, if the calcium carbonate is to be used in enamel paints, I have found it desirable that substantially all of the particles of said calcium carbonate should have diameters of less than about 8 microns, and preferably less than about 6 microns. However, when used in other paint formulations, such as in flat paints, I have found it unnecessary to subject the calcium carbonate to such severe grinding. Thus, in flat paints, exceptionally good results have been obtained by employing calcium carbonates of which substantially all of the particles were less than bout 15 microns in diameter. Said wet milling may be effected in any of the wet milling devices well known to the art, such as pebble mills, colloid mills, and the like. In view of the fact that the calcite form of calcium carbonate produced by my novel process is more brittle than the other forms of calcium carbonate normally encountered, e. g., the aragonite form, it may be reduced to particles of a desired fineness more readily than is the case, for example, when attempt is made to mill most deposits of naturally occurring calcium carbonate.

My process possesses advantages not previously combined in a single process. Furthermore, the products of my process possess advantages not previously combined in a white pigment extender material. For instance, my novel process permits the removal of iron disulfide from calcium carbonate ores improving the color of said ores. Furthermore, it permits the conversion to crystalline calcite of the other forms of calcium carbonate encountered in naturally occurring calcium carbonate deposits and thus provides calcium carbonate in a form which may be wet milled readily to provide a calcium carbonate extender of sufficiently good fineness for employment in paint formulations, particularly the enamel type. Moreover, the novel products of my invention equal and in certain instances exceed precipitated calcium carbonates in strength and color, and are definitely superior in these properties to prior art milled, naturally occurring calcium carbonate extender materials. Furthermore, the novel products of my invention have definitely lower oil absorptions than do prior art precipitated calcium carbonates and, in fact, have oil absorptions sufficiently low to permit their ready employment in enamel type paint formulations. Moreover, when employed in said enamel type paint formulations, the novel calcium carbonate extender material products of this invention produce films of excellent color and gloss, whereas prior art precipitated calcium carbonate and prior art milled, naturally occurring calcium carbonate, when employed in such formulations, produce films having undesirably low gloss, and, in many instances, produce films having a dull, matte appearance.

As many apparently different embodiments of this invention may be made without departing from the spirit and scope thereof, it is to be understood that I do not limit myself to the specific embodiment except as defined in the appended claims.

Having described the present invention the following is claimed as new and useful:

1. In a process for producing an improved extender material the steps which comprise taking a calcite ore comprising iron disulfide, said ore being in the form of a coarse powder, and heating it at a temperature between about 425° C. and about 550° C. to develop magnetic susceptibility and thereafter passing it through a magnetic separator.

2. In a process for producing an improved extender material the steps which comprise drymilling a calcite ore comprising iron disulfide until substantially all of said material has a particle size between about 0.1 millimeter and about 0.6 millimeter in diameter, heating this material at a temperature between about 425° C. and about 550° C., and thereafter passing said material through a magnetic separator.

3. In a process for producing an improved extender material the steps which comprise dry milling a calcite ore comprising iron disulfide until substantially all of said material has a particle size of between about 0.1 millimeter and about 0.6 millimeter in diameter, heating at a temperature between about 425° C. and about 550° C. for a period of time between about 1 minute and about 20 minutes, passing said material through a magnetic separator, wet-milling the calcium carbonate fraction and thereafter dewatering, drying and dry-milling.

4. In a process for producing an improved extender material the steps which comprise dry-milling a calcite ore comprising iron disulfide until substantially all of said material has a particle size between about 0.15 millimeter and about 0.5 millimeter in diameter, heating this material in an oxidizing atmosphere at a temperature between about 450° C. and about 550° C. for a period of time between about 1 minute and about 20 minutes, cooling the material and passing it through a magnetic separator, wet-milling the calcium carbonate fraction until substantially all of said particles have a diameter of not more than about 15 microns, and thereafter dewatering, drying and dry-milling.

5. In a process for producing an improved extender material the steps which comprise taking a calcite ore comprising at least 98% calcium carbonate and comprising iron disulfide and dry-milling until substantially all of said material has a particle size of between about 0.25 millimeter and about 0.45 millimeter in diameter, heating the material in an oxidizing atmosphere at a temperature between about 450° C. and about 550° C. for a period of time between about 1 minute and about 20 minutes, cooling the material and removing substantially all the magnetic impurities by passing it through a magnetic separator, wet-milling the calcium carbonate until substantially all of said material has a particle size of not more than about 8 microns in diameter, and thereafter dewatering, drying, and dry-milling.

6. In a process for producing an improved extender material the steps which comprise taking a calcite ore comprising at least 98% calcium carbonate and comprising iron disulfide and dry-milling until substantially all of said material has a particle size between about 0.25 millimeter and about 4.5 millimeters in diameter, heating this material in an oxidizing atmosphere comprising at least 10% oxygen at a temperature between about 500° C. and about 550° C. for a period of time between about 5 minutes and about 15 minutes, cooling the material and removing substantially all the magnetic impurities by passing it through a magnetic separator, wet-milling the calcium carbonate fraction until substantially all of said material has a particle size not exceeding about 6 microns in diameter and thereafter dewatering, drying, and dry-milling.

RAY L. McCLEARY.